March 12, 1957  I. M. DETTERMAN  2,784,982
SUPPLEMENTAL SWIVEL WHEEL MOUNTING FOR TRUCKS
Filed March 14, 1955  2 Sheets-Sheet 1
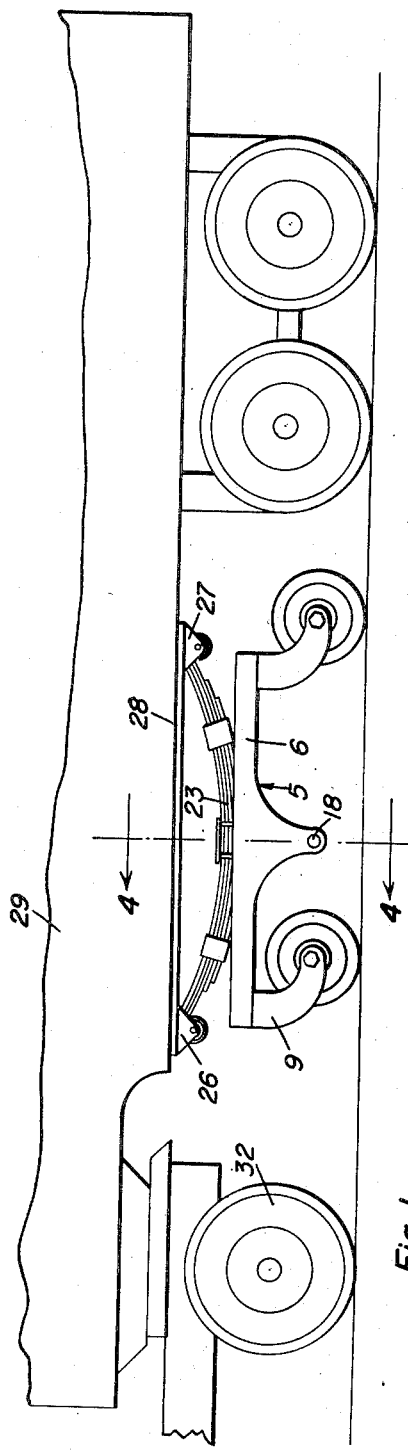
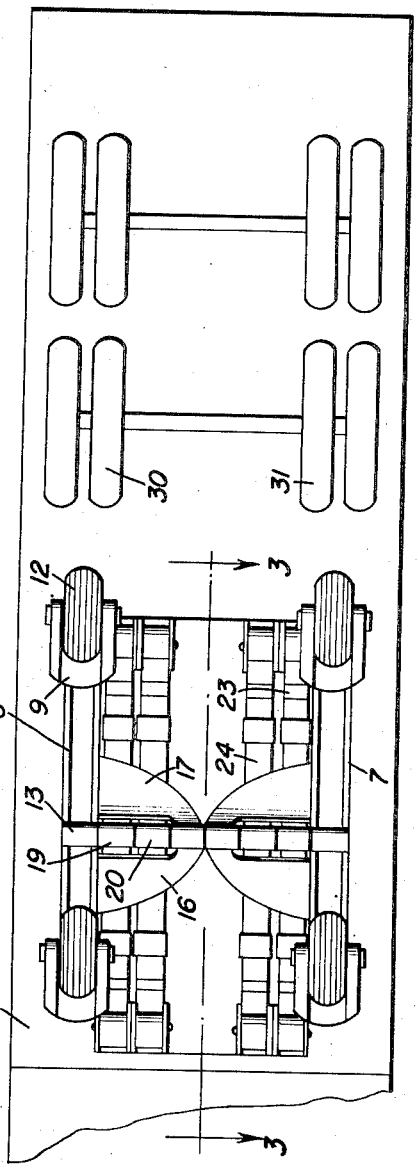
Ivan M. Detterman
INVENTOR.

March 12, 1957    I. M. DETTERMAN    2,784,982
SUPPLEMENTAL SWIVEL WHEEL MOUNTING FOR TRUCKS
Filed March 14, 1955    2 Sheets-Sheet 2

Ivan M. Detterman
INVENTOR.

BY *Clarence A. O'Brien
and Harvey B. Jacobson*
Attorneys

United States Patent Office 2,784,982
Patented Mar. 12, 1957

2,784,982

SUPPLEMENTAL SWIVEL WHEEL MOUNTING FOR TRUCKS

Ivan M. Detterman, Green Springs, Ohio, assignor of one-third to Albert T. Zbinden, Tiffin, Ohio Application March 14, 1955, Serial No. 494,064

2 Claims. (Cl. 280—104.5)

The present invention relates to new and useful improvements in trucks and more particularly to a supplemental wheel mounting for trailer trucks to relieve the tractor of the weight of the trailer and enable the carrying of greater loads.

An important object of the invention is to provide a wheel mounting at each side of the front end of a trailer truck and on which a plurality of wheels are swivelly mounted to swing freely in accordance with the direction of travel of the trailer to reduce friction and wear on the tires.

Another object is to provide a wheel mounting composed of a pair of longitudinal frames having swivelly mounted wheels at each end and pivoting the frames at their central portions for vertical rocking movement of the wheels in accordance with road irregularities.

A further object is to equip the pivoted wheel frame with vehicle springs.

A still further object is to provide a device of this character of simple and practical construction, which is efficient and reliable in operation, strong and durable, relatively inexpensive to manufacture and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is a bottom plan view;

Figure 3:
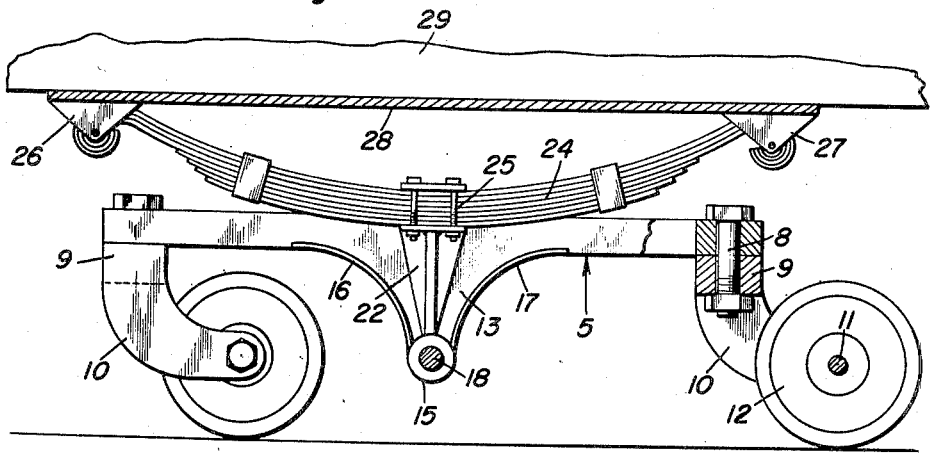
Figure 3 is an enlarged vertical sectional view taken on a line 3—3 of Figure 2.
Figure 4:
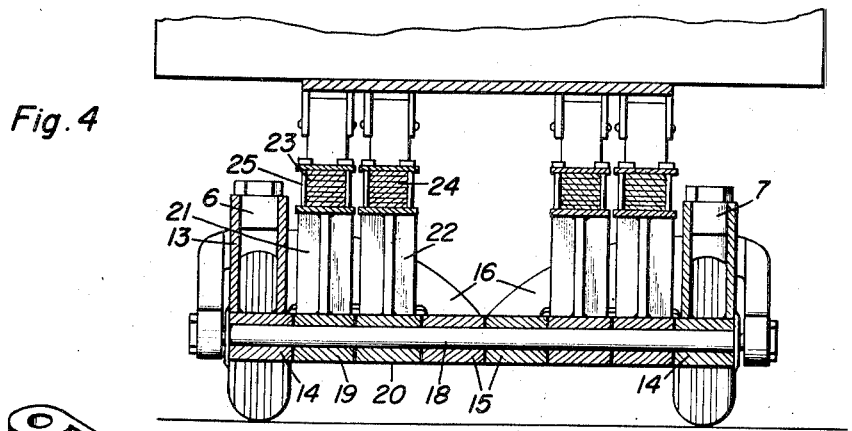
Figure 4 is an enlarged transverse sectional view taken on a line 4—4 of Figure 1.
Figure 5:
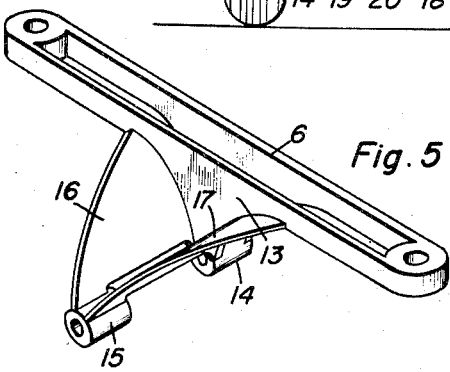
Figure 5 is an enlarged perspective view of one of the pivoted wheel frames.

Referring now to the drawings in detail, wherein for the purpose of illustration I have disclosed a preferred embodiment of my invention, the numeral 5 designates a wheel mounting generally and which includes a pair of duplicate wheel frames 6 and 7 of channel construction and each having a vertical spindle 8 at each end and on the lower end of which a yoke 9 is pivoted. The yoke is provided with a pair of spaced-apart downwardly curved arms 10 in the lower ends of which a transverse axle 11 is supported and having a wheel 12 journaled thereon between the arms for swivelly mounting the wheels at the ends of the frame and offset with respect to their spindles to swing the wheels in a trailing position with respect to their direction of travel.

The central portion of each frame 6 and 7 is formed with a downwardly projecting web 13 having a bearing 14 at its lower end and a second bearing 15 is supported in spaced apart axially aligned relation to bearing 14 by means of a pair of brace webs 16 and 17 projecting laterally from web 13 and having diverging upper end portions to oppose stresses subjected to the bearing 15 from opposite directions.

The bearings 14 and 15 of each frame 6 and 7 are pivoted on a transverse shaft 18 and the shaft also pivotally supports a pair of bearings 19 and 20 between each pair of bearings 14 and 15. The bearings 19 and 20 are formed at the lower ends of vertical supports 21 and 22 of cruciform shape in cross-section and which are attached at their upper ends to the central portion of semi-elliptical vehicle leaf springs 23 and 24, respectively, by bolts and nuts 25.

The ends of the leaf springs are secured in hanger brackets 26 and 27 which are, in turn, secured to a sheet metal plate 28 at the underside of a trailer body 29.

The wheel frames 6 and 7 are supported under the trailer in a longitudinal position in front of the rear dual wheels 30 and 31 of the trailer so that the front and rear swivel wheels of the supplemental wheel mounting will support the weight of the front end of the trailer and relieve the tractor 32 of the load.

The yokes 9 for the swivel wheels will maintain the latter in a trailing position with respect to the pivots 8 for the yokes so that the wheels will swing freely with changes in the direction of the trailer to reduce friction and wear on the tires on the wheels.

The wheel frames 6 and 7 rock on the shaft 18 in response to road irregularities so that an equal distribution of the load is maintained on the front and rear swivel wheels.

For the most efficient functioning of the device, the transverse shaft 18 must be located in or below the plane at which the four axles 11 for wheels 12 operate.

The supplemental wheel mounting may be installed on other types of trucks in addition to trailer trucks as disclosed herein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A supplemental wheel mounting for trucks comprising an attaching plate adapted for attaching to the underside of a truck body, a plurality of leaf springs connected to the underside of the plate, vertical supports at the center of the leaf springs and having bearings at their lower ends, a transverse shaft in the bearings, a pair of elongated members having wheels swivelly mounted at each end, and a pair of aligned bearings at the central portion of each of said members for rockably mounting the members on the shaft in a longitudinal position with respect to the truck body, said first named bearings being positioned between each of said pairs of said second named bearings, each of said members including a web at the underside of its central portion and having a bearing at its lower portion, a pair of brace webs projecting laterally at one side of the first web, and a bearing at the lower portion of said brace web and aligned with the first named bearing on said member and between which at least one of the spring supporting bearings is positioned.

2. A supplemental wheel mounting for trucks comprising a pair of elongated frames, wheels swivelly mounted on each end of the frames, webs depending centrally from the frames and having bearings thereon spaced by said webs below said frames, a cross shaft mounted in the bearings of the webs of both frames, vertical supports upstanding from said shaft and having lower bearing ends journaled on said shaft, leaf springs attached at their centers on top of said supports, and a plate attachable to a truck and having the ends of said leaf springs connected thereto.

References Cited in the file of this patent

UNITED STATES PATENTS

| | | |
|---|---|---|
| 1,739,450 | Fageol | Dec. 10, 1929 |
| 1,909,396 | Feigelson | May 16, 1933 |
| 2,072,787 | Anderson | Mar. 2, 1937 |
| 2,403,833 | Spangler | July 9, 1946 |
| 2,539,360 | Bartlett | Jan. 23, 1951 |